Feb. 21, 1967  A. G. NESHER  3,304,913
RECEPTACLE CLOSURE
Filed July 26, 1965  2 Sheets-Sheet 1

INVENTOR.
Alexander G. Nesher
BY
Synnestvedt + Lechner
ATTORNEY.

Feb. 21, 1967
A. G. NESHER
3,304,913
RECEPTACLE CLOSURE
Filed July 26, 1965
2 Sheets-Sheet 2
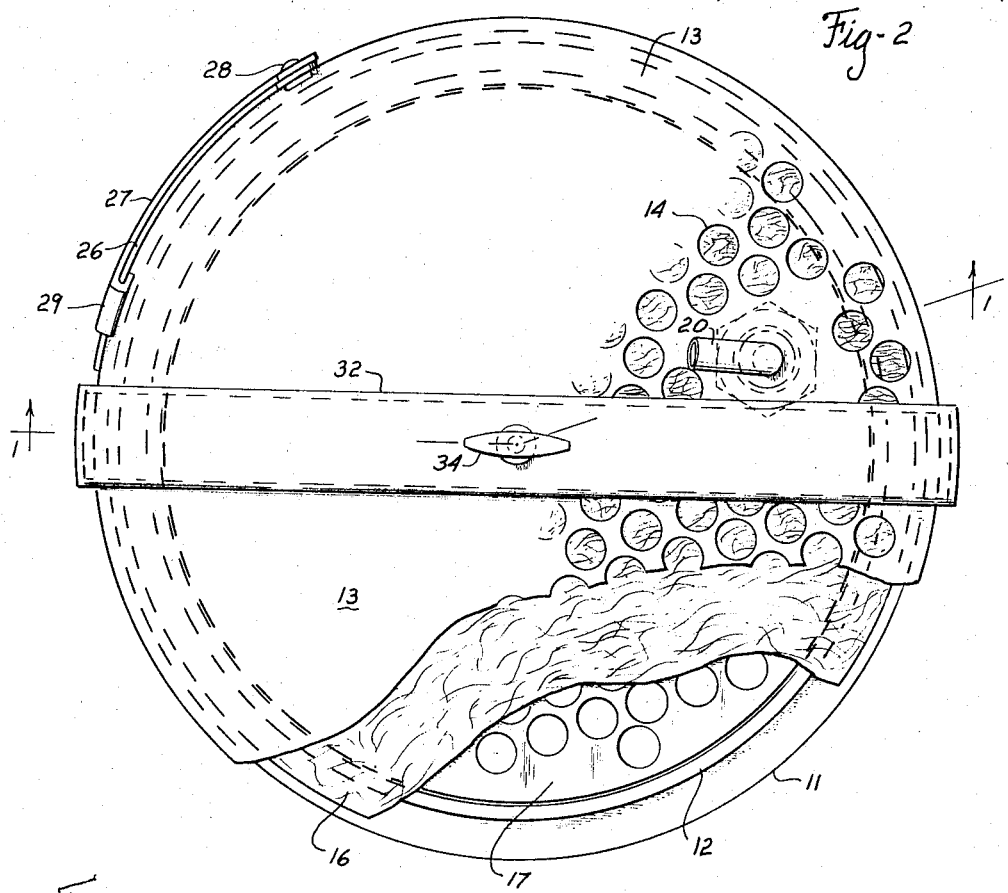
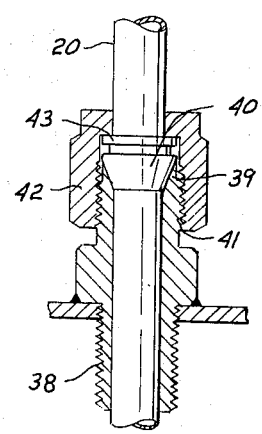
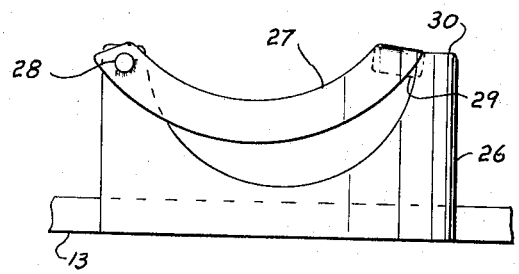
INVENTOR.
Alexander G. Nesher
BY
Synnestvedt + Lechner
ATTORNEYS United States Patent Office 3,304,913
Patented Feb. 21, 1967

3,304,913
RECEPTACLE CLOSURE
Alexander G. Nesher, Rosemont, Pa., assignor to Air Control, Inc., Norristown, Pa., a corporation of Pennsylvania
Filed July 26, 1965, Ser. No. 474,783
6 Claims. (Cl. 119—15)

This invention relates to receptacle closures and more particularly to closures for receptacles used to house living organisms in testing and research laboratories.

Closures constructed according to the present invention are particularly well suited for use in isolating viruliferous animals, such as rats, mice and hamsters which are commonly used in conjunction with medical or other types of biological research programs. In carrying out these programs, it is essential that technicians and other persons working in the area in which the tests are being conducted be absolutely protected from the contagious viruses carried by the animals. This is particularly true when studies and tests are being conducted on animals carrying diseases such as leukemia, since contact with such viruses might well prove fatal to the attendants. While the closure must isolate the viruses it must also provide a means for supplying the animals with air and water, and must protect them from contaminants in the atmosphere which might alter rigidly controlled test conditions.

The present invention provides a highly effective closure which absolutely seals the container, so that air can only pass in through an extremely fine filter medium having a fineness such that viral colonies capable of surviving in the atmosphere cannot pass through. The filter unit is mounted within the closure in such a manner that is readily removable for disposal and replacement. The remaining portions of the unit are constructed of a material which will withstand autoclaving temperatures and which in addition, is substantially non-porous.

Among the other unique features of the invention, is the provision of a unique means for delivering water and other liquids to the interior of the container, including means for regulating the water delivery pressure and hence the amount of water which the animals housed in the container will receive.

Another unique feature of the invention, is the provision of an arrangement of the parts in which the filter medium also functions as a seal around the edge or rim of the container. The foregoing sealing portion of the filter is compressed into sealing engagement around the opening by means of a novel clamping structure in such a manner that an absolutely air tight seal is provided.

Among the other objects and advantages of the invention is the provision of a simple and effective means connecting the liquid delivery tube to the closure so that an absolutely air tight seal is provided. According to an alternative embodiment of the invention, the sealing means for the liquid delivery tube is made adjustable so that the height of the delivery end of the tube can be varied in accordance with the size of the container and the size of the animals housed therein.

The foregoing and other objects and advantages of the invention are achieved by a closure which comprises a first foraminous plate dimensioned to cover the mouth of the container, and a filter member underlying the foraminous plate, the filter member covering the mouth of the container. A second foraminous plate underlies the filter member, and means are provided for removably securing the foraminous plates together with the filter member clamped therebetween. A threaded member is secured to the first foraminous plate, the second plate being apertured to receive the threaded member. The liquid delivery tube passes through the threaded member and a removable clamping nut cooperates with the threaded member below the second foraminous plate to clamp the plates and the filter in position.

Turning now to the detailed description of an illustrative embodiment of the invention, shown in the accompanying drawings in which:

FIG. 2 is a plan view of the closure viewed in section in FIGURE 1, with certain portions of the closure being broken away to better illustrate certain features of the invention;

FIGURE 3 is a detailed view of an alternative means for securing the liquid delivery tube to the cover;

FIGURE 4 is a detailed view of the bottle support shown on the closure illustrated in FIGURES 1 and 2.

Figure 1:
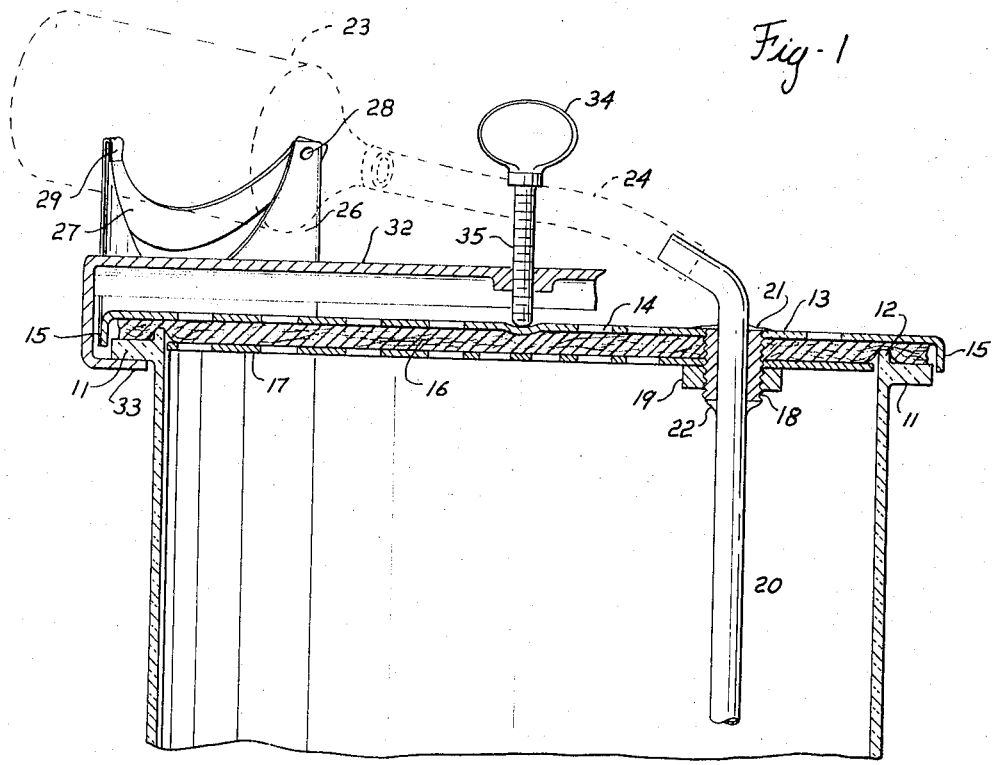
FIGURE 1 is a sectional view of a closure formed in accordance with the present invention, shown mounted on a typical glass container.

Referring now to FIGURE 1, the closure is shown mounted on a typical glass container or receptacle 10, of the type commonly used in research laboratories to house virus carrying animals. The container or receptacle 10 is provided with an outwardly extending flange 11 and may also be provided with a slightly upwardly extending rim 12, although such rim is by no means essential for carrying out the objects of the invention.

The closure includes a first foraminous plate 13. As may be seen in both FIGURES 1 and 2, the plate is provided with relatively large apertures 14 which extend over the major portion of its surface. The plate is dimensioned so that it extends beyond the outer periphery of the mouth of the receptacle 10 and may have down turned flanges 15 which extend beyond the flange 11 of the receptacle 10.

Underlying the plate 13 is a fine glass filter 16, which in the illustrative embodiment is formed so as to filter out all particles of matter having a size of .5 micron or larger. Such filters are readily available on the market, one such filter being manufactured by the Owens-Corning Fiberglas Company under the catalog No. SN. 004–Filter Medium. Underlying the filter medium is a second foraminous plate 17, dimensioned so as to fit within the mouth of the container.

Means are provided to secure the plates together, with the filter medium sandwiched therebetween. In the illustrative embodiment this means includes a hollow, threaded bushing 18, welded to the first foraminous plate. The bushing extends through an aperture in the second foraminous plate far enough to receive a clamping nut 19. By threading the clamping nut on the threaded bushing, the filter medium 16 is retained in place. As may be seen in FIGURE 1 the bushing 18 is bored to receive a tube 20. In order to insure an absolutely air tight seal between the bushing and the tube, the parts are joined by silver solder preferably at the ends 21 and 22 of the bushing 18. The upper end of the tube is connected to a bottle 23 filled with water or any other liquid which is to be supplied to the animals within the container, by means of a piece of tubing 24. Suitable sealing means are provided to insure an absolutely air tight seal between the bottle 23 and between the tubing pieces 24 and 20.

Since the inside of the bottle when filled with water is absolutely air tight, water will not ordinarily flow out of the lower end of the tube 20, except when an animal sucks the end of the tube. To insure that the animal's mouth will not be injured, the end of the tube 20 should be slightly coned or rounded as shown at 25.

Bottle 23 is mounted on a curved support member 26 which in turn is provided with a movable support arm 27 pivoted on the support 26 by a pin 28. Support arm 27 is provided with a bent over portion 29 as shown in FIGURES 1 and 4 which is adapted to rest on an upstanding portion of the support 26. The support arm 27 may be retracted simply by lifting it slightly to release the lip 29 from the edge 30. The arm is then free to be dropped out of the way. It should be evident that when the arm is in the upper position and the bottle is cradled on its curved surface, less suction will be required to deliver water to the animals than when the bottle is cradled on the curved surface of the support 26.

In order to secure the closure to the receptacle, I provided a clamping arm 32 which is formed with downwardly and inwardly turned end portions 33, one of which is shown in FIGURE 1. At about its mid-point, the clamping arm is provided with an aperture which is threaded to receive a wing bolt 34. Wing bolt 34 is provided with threads as shown at 35 which cooperate with the threads on the clamping arm 32. When the clamping arm is in position with its inturned portions 33 beneath the flanges 11 on the receptacle 10, tightening of the nut 34 presses down on the plate 13 and the filter 16. This clamping pressure forms a positive seal around the edges of the closure, insuring that the only air passage to or from the closure is through the filter 16.

When the closure is to be used for various sized containers or for a different sized animal, it may be desirable to alter the height of the end of the delivery tube 20. For this purpose, I provided a modified form of coupling member for connecting the supply tube 20 to the cover plate 13. This coupling, shown in FIGURE 3, includes a threaded bushing 38 which passes through the filter medium and through the second foraminous plate 17 and receives a clamping nut in the same manner as does the bushing 18 in FIGURE 1. The bushing 38, however, extends above the surface of the foraminous plate 13 and is provided with frusto-conic recess 39. A collar 40 is slideably mounted on the tube 20. The collar 40 is also frusto-conically shaped and is adapted to fit within the frusto-conic recess 39.

The upper portion of bushing 38 is externally threaded as shown at 41 to receive a clamping nut 42 slideably mounted on the tube 20. The nut is adapted to engage a shoulder 43 on the collar 40 to force the two frusto-conic surfaces into engagement with each other. Continued tightening of the nut 42 causes the collar to be swaged into engagement with the outer surface of the tube, creating an air tight connection. By loosening the nut 42 the tube may be moved so that its lower end 25 (FIGURE 1) is set at the desired height with respect to the bottom of the container 10.

All elements of the closure are preferably formed of stainless steel so that the unit may be placed in an autoclave and subjected to high temperatures for sterilization purposes. Since this material, when polished, is relatively non-porous, the closure may be reused with practically no other cleaning after autoclaving and replacement of the filter.

It may be seen from the foregoing that I have provided a simple and effective means for insuring absolute isolation of living virus carrying animals or other organisms. The invention has the advantages of simplicity in design, durability and economy of manufacture, highly desirable for equipment of this type.

I claim:
1. A closure for the mouth of a receptacle comprising: a foraminous plate dimensioned to cover said mouth; a filter member underlying said foraminous plate, said filter member covering said mouth; and means for securing the foraminous plate to the recptacle with said filter in position at the mouth of the receptacle, a tube extended through the cover plate and filter member, and a support for a bottle for liquid, the support being mounted on the cover plate and the tube being connectible with the bottle said support having a curved surface for cradling a bottle in an inclined position, an arm pivotally mounted at one side of said surface, said arm extending across said surface, and means supporting the free end of the arm adjacent said surface, said arm being shaped to provide a second support surface for holding a bottle in a raised position with respect to said first mentioned inclined position when the free end of the arm is supported, said arm being moveable to a retracted position to permit the support of said bottle on said first mentioned support surface.

2. A receptacle for housing viruliferous animals, said receptacle comprising a body having bottom and side wall portions and a mouth comprising the only access to the interior of said receptacle, a closure for said mouth comprising a filter member covering the mouth, the filter member extending over the edge of the mouth, and the closure further comprising a formainous cover plate overlying the filter member, means securing said cover plate to the receptacle with the filter member clamped between the cover plate and the edge of the mouth, said plate having an imperforate area, a tube extending through said imperforate area and through said filter member for supplying liquid to the interior of the receptacle, and means providing an air-tight seal between the tube and the surrounding impeforate area.

3. For use with a receptacle for housing viruliferous animals, said receptacle having bottom and side wall portions and a mouth comprising the only access to the interior of said receptacle; a closure device for the mouth of such a receptacle comprising a filter member of size greater than the receptacle mouth so as to extend over the edge of the mouth, and the closure device further comprising a foraminous cover plate overlying the filter, means adapted to secure the cover device to the receptacle with the filter member clamped between the cover plate and the edge of the mouth, said plate having an imperforate area, a tube extending through said imperforate area and through said filter for supplying liquid to the interior of the receptacle, and means providing an air-tight seal between the tube and the surrounding imperforate area.

4. A closure device according to claim 3 in which said filter member is formed so as to prevent the passage of particles having a size of 0.5 micron or larger.

5. A receptacle closure according to claim 3, the construction further including a second foraminous plate underlying the filter member, and means for removably securing the foraminous plates together with the filter member clamped there between including a threaded member surrounding the tube, the second plate being apertured to pass the threaded member and tube, and a removable clamping nut cooperating with said threaded member below the second foraminous plate.

6. Apparatus according to claim 5 further including adjustable mounting means for securing said tube to said threaded member in different adjusted positions, said adjustable mounting means comprising a frusto-conic collar mounted on said tube and a complementary angled frusto-conic recess formed in said threaded member for receiving said collar and means for forcing said collar into said recess, thereby creating an air-tight seal around said tube.

References Cited by the Examiner
UNITED STATES PATENTS

| | | | |
|---|---|---|---|
| 1,801,949 | 4/1931 | Broudy et al. | 55—504 |
| 2,467,525 | 4/1949 | Fricke | 119—15 |
| 2,881,733 | 4/1959 | Young et al. | 119—15 |
| 3,227,139 | 1/1966 | Gass et al. | 119—17 |

SAMUEL KOREN, *Primary Examiner.*

HUGH R. CHAMBLEE, *Examiner.*